United States Patent [19]

Kopp et al.

[11] 4,378,928
[45] Apr. 5, 1983

[54] MOLDING APPARATUS

[75] Inventors: Edward J. Kopp, Elmhurst; Leon J. Iwinski, Westchester; Frank Guzzo, Melrose Park; Ronald F. Speechley, Westchester; Frank Femali, Hillside, all of Ill.

[73] Assignee: Beatrice Foods Company, Chicago, Ill.

[21] Appl. No.: 347,732

[22] Filed: Feb. 10, 1982

Related U.S. Application Data

[63] Continuation of Ser. No. 161,758, Jun. 23, 1980, abandoned.

[51] Int. Cl.³ ............................ B29F 1/14; B29C 7/00
[52] U.S. Cl. ....................................... 249/63; 249/144; 249/184; 425/393; 425/403
[58] Field of Search ................... 249/63, 180, 184, 58, 249/144; 425/403, 438, 393

[56] References Cited

U.S. PATENT DOCUMENTS

| | | | |
|---|---|---|---|
| 3,248,756 | 5/1966 | Mills et al. ........................ | 249/180 X |
| 3,339,292 | 9/1967 | Lamb ............................... | 249/180 X |
| 3,373,460 | 3/1968 | Ladney ............................ | 249/63 X |
| 3,534,443 | 10/1970 | Tucker ............................. | 249/63 X |
| 3,677,684 | 7/1972 | Platz ................................. | 425/393 |
| 3,905,740 | 9/1975 | Lovejoy ........................... | 249/63 X |
| 4,019,711 | 4/1977 | Altenhof et al. ................ | 249/180 X |

Primary Examiner—J. Howard Flint, Jr.
Attorney, Agent, or Firm—Hosier, Niro & Daleiden

[57] ABSTRACT

This is a molding apparatus designed to mold a plastic tub of circular transverse cross-section and re-entrant shape. Specifically, the tub tapers from its closed bottom to its opened top. The mold core is, therefore, collapsed radially to permit extraction of the plastic tub from the mold. This radial collapse is accomplished by forming the mold core of a central segment and a plurality of peripheral segments, and then axially extending the central segment while moving the peripheral segments along a radially inward path so that core collapse occurs. The exterior shape of the peripheral core segments defines a circular cross-sectional shape for the interior of the tub, despite the fact that the central core segment has the configuration of a hexagonal pyramid. Side mold segments which move radially outwardly and a tub extraction ram complete the equipment for extracting the tub from the mold.

10 Claims, 7 Drawing Figures

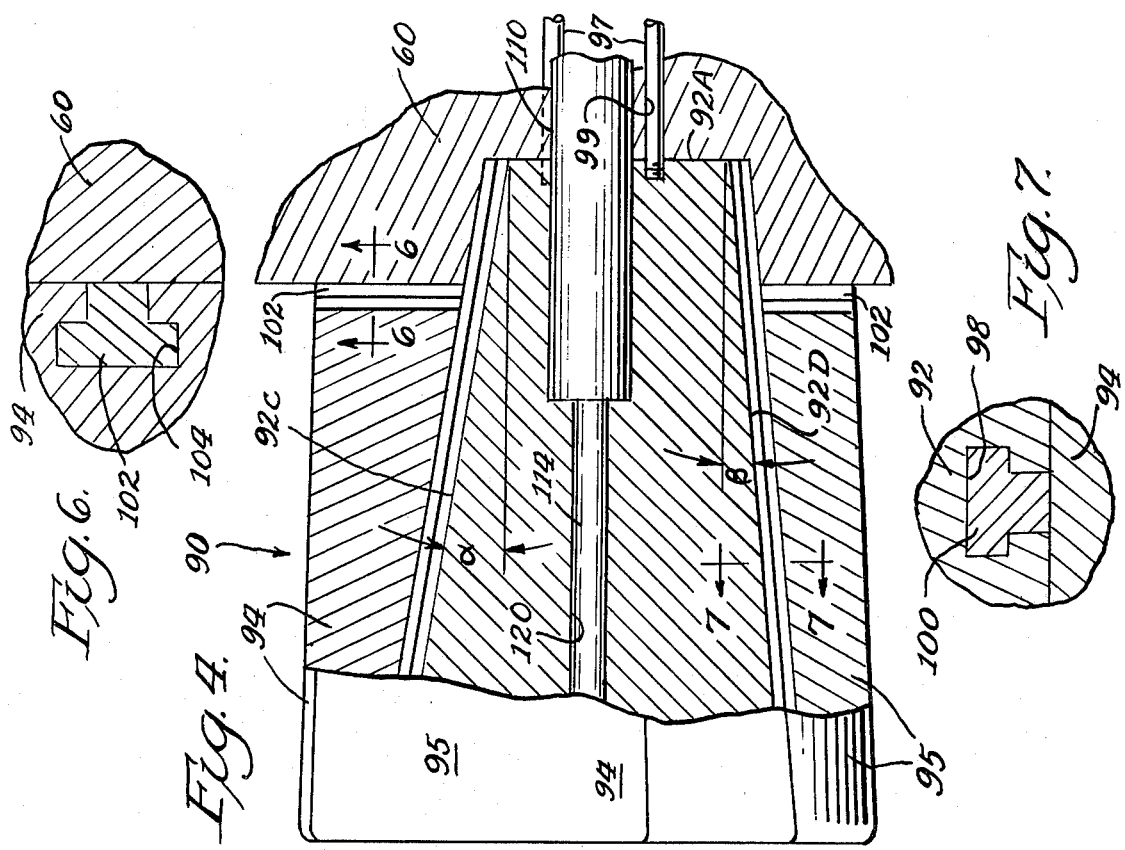
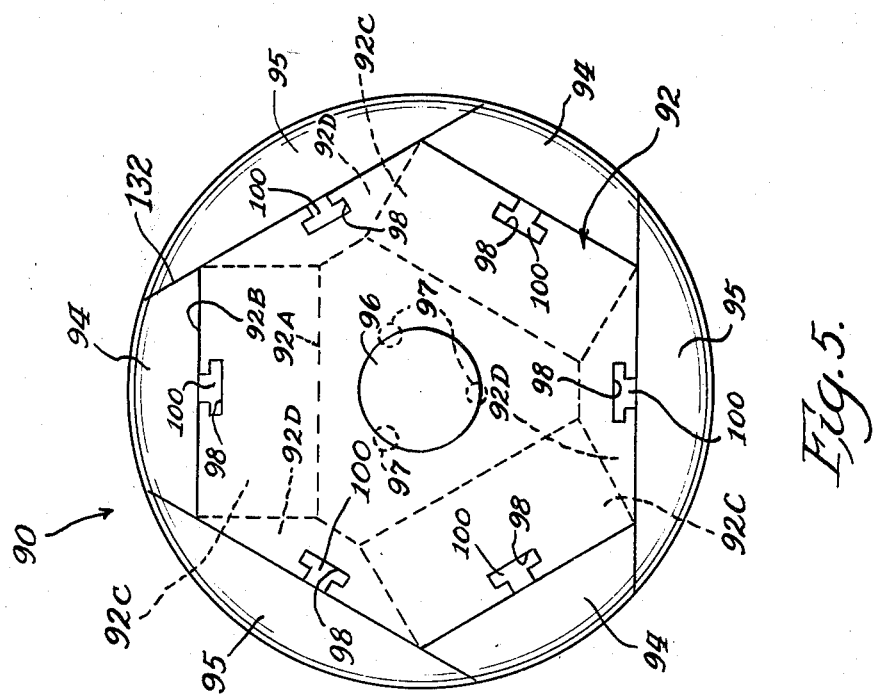

MOLDING APPARATUS

This is a continuation of application Ser. No. 161,758, filed June 23, 1980, now abandoned.

This invention relates generally to molding apparatus and in particular to equipment for injection molding of plastic containers.

BACKGROUND

The problem with which this invention is concerned is the molding of a hollow plastic container such as a large tub for use in a washing machine. In a particular washing machine design, the tub has an open top and a closed bottom, and it tapers toward the open top so that the diameter of the opening is smaller than the diameter of the rest of the tub. Such re-entrant shapes present certain difficulties in the design of molding equipment, because during the molding process it is necessary for the mold core to have a maximum diameter as large as that of the tub bottom, yet this core must subsequently be withdrawn through the smaller diameter at the opening of the tub.

In addition, this particular washing machine tub has a circular transverse cross-section, which is more difficult to mold when the shape is re-entrant.

In U.S. Pat. Nos. 3,865,529 and 3,905,740, which are assigned in common with this application, a technique is shown for withdrawing a mold core from a re-entrant plastic tub. The core is made in separate segments which move relative to each other. After the molding step is completed, this movement of the segments causes the core to collapse radially inwardly so that its effective diameter is reduced, permitting the core then to be withdrawn from the narrower diameter interior of the tub. In these prior art patents, there is a central core segment and a number of peripheral core segments which slide on the outer faces of the central core segment. Core collapse is achieved because the sliding motion of the peripheral core segments has a radially inward component which reduces the core diameter. The outer faces of the central core segment must be flat to permit the sliding motion of the peripheral core segments relative thereto. That shape does not lend itself readily to the molding of a circular cross-section.

In U.S. Pat. No. 3,865,529 the relative motion between the peripheral and central core segments is achieved by extending the peripheral core segments toward the tub as they collapse, thereby moving the tub away from the central segment.

In U.S. Pat. No. 3,905,740 this relative motion is achieved by withdrawing the central core segment from the tub, leaving the collapsed peripheral core segments within the tub interior.

SUMMARY OF THE INVENTION

The present invention takes yet another approach; it extends the central core segment toward the tub and thereby moves the tub away from the collapsed peripheral segments.

This invention provides apparatus for molding a hollow plastic tub which has an open end and an interior side wall surface with a circular transverse cross-section. In this apparatus are core means for molding the interior surface of the tub, including central core segment means having a polygonal transverse cross-section and a plurality of peripheral core segment means surrounding the central core segment means. The peripheral core segment means have respective outward faces having the transverse cross-sectional shapes of sectors of a circle, thus permitting them to mold respective portions of the circular interior surface of the tub side wall.

In accordance with another feature of the invention, the central core segment means tapers toward the open end of the plastic tub. In addition, there are means for moving one of the core segment means axially relative to the other of the core segment means during a tub extraction phase of operation. The direction of this movement is such that the peripheral core segment means winds up at least partly outside the tub at the conclusion of the axial movement. Finally, there are means responsive to this axial movement for simultaneously displacing the peripheral core segment radially inward of the plastic tub so as to collapse the mold core means during the tub extraction phase of operation.

The central core segment means tapers toward the open end of the plastic tub, and the peripheral core segment means move relative to the central core segment means in a sloping path extending axially toward the smaller end of the central core segments means and radially inwardly of the plastic tub, thus collapsing the mold core means for the purpose of extraction.

In one specific embodiment of the invention, the central core segment means has a pyramidal shape.

The movements of the core segment means are preferably correlated by guide means which guide the peripheral core segment means radially inwardly during axial motion of the core segment means. Specifically, these guide means may be on the outer surface of the central core segment means.

The invention may be understood in greater detail by reference to the following detailed description of a preferred embodiment when taken in conjunction with the following drawings.

BRIEF DESCRIPTION OF THE DRAWINGS

FIG. 4 is a side elevational view of the mold core structure of this molding apparatus.

FIG. 5 is an end elevational view of the same mold core structure.

FIG. 6 is a fragmentary sectional view taken along the lines 6—6 of FIG. 4.

FIG. 7 is a fragmentary sectional view taken along the lines 7—7 of FIG. 4.

DETAILED DESCRIPTION OF THE PREFERRED EMBODIMENTS

Figure 1:
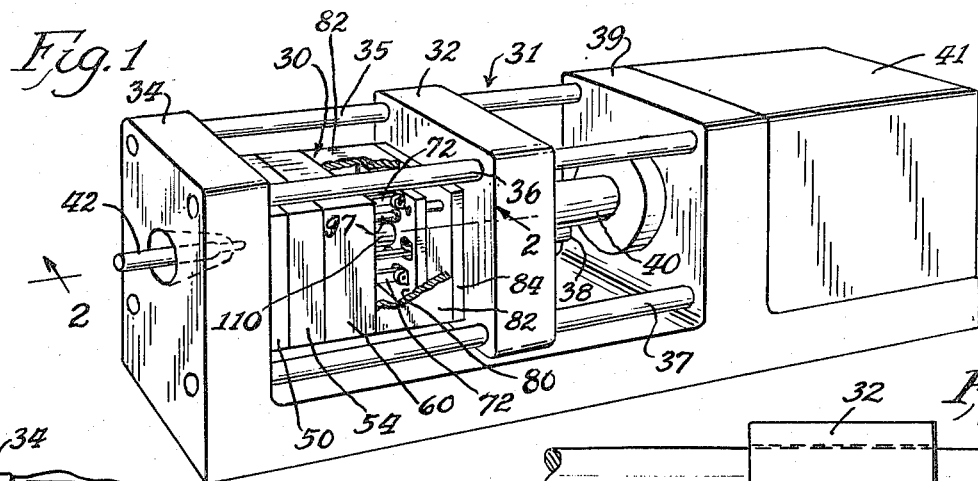
FIG. 1 is a semi-schematic perspective view of a preferred embodiment of the mold apparatus of this invention.

FIG. 1 is a somewhat simplified illustration of a mold 30 used to manufacture a plastic article. The mold is supported in a horizontal hydraulic press 31 of conventional design. Separable sections of the mold are carried respectively by a slidably movable platen 32 and a fixed platen 34 disposed in facing relationship to platen 32. A set of four horizontal platen guide rails 35–38 are fixed secured adjacent the four corners of the fixed platen 34, and extend in parallel relation through the movable platen 32, and are fixedly secured in a stationary backing plate 39. The platen 32 is slidably movable along the guide rails 35-38 between a closed or molding position shown in FIGS. 1 and 2, and an open or ejection position illustrated in FIG. 3. The platen 32 moves under the influence of a main piston rod 40 which is powered by a hydraulic cylinder located in the housing 41 of press 31. The molten thermoplastic material for producing the molded article is introduced into the molding cavity of mold 30 through a primary inlet sprue 42 which enters the mold structure from the rear of fixed platen 34.

The mold 30 includes a first mold section 50 which is fixedly secured to the stationary platen 34, and has a mold-defining surface corresponding to the outside of a bottom wall 52B of a tub 52 of circular cross-section molded by the apparatus of this invention. The mold section 50 includes a circumferential flange to lend radial support to side mold segments 54 which mold the circular side walls 52S of the plastic tub 52. The mold section 50 is also provided with clearance openings 50B to accommodate a plurality of inclined guide posts 56, which displace the side mold segments 54 during the opening and extraction phase of operation of the mold 30. Mold section 50 also houses conventional gating means 58 for introduction of the plastic material into the mold cavity to form the plastic article 52.

A second mold section 60 is mounted on the movable platen 32, and is disposed in facing relationship to the first mold section 50 and the side mold segments 54. Frame members 82 secure the mold section 60 to plate 84, which in turn is bolted to the platen 32. The frame members 82 provide a clearance space between mold section 60 and plate 84. This space accommodates a movable platform 80 and associated structures mounted thereon. This platform and its associated structures serve, in a manner which will soon be described, as mold core collapsing means.

The side mold segments 54 are held at a fixed distance in relation to the movable platform 80. Each of the side mold segments 54 is connected by a pivot pin 70 to the adjacent end of a connecting link 72. In order to permit pivotal motion of the links 72 about their pivot pins 70, the side mold segments 54 are formed with clearance openings 74 within which the adjacent ends of the connecting links 72 are received. The opposite ends of the connecting links 72 are connected by pivot pins 76 and flanges 78 to the platform 80.

The latter is carried by auxiliary piston rods 62 which are actuated by cylinders 64 mounted on the moveable platen 32. When these cylinders drive the piston rods 62, the platform 80 moves relative to the platen 32. Note that clearance bores 66 extend through the platen 32 so that the piston rods 62 may move freely relative thereto when actuated by the hydraulic cylinders 64.

Figure 2:
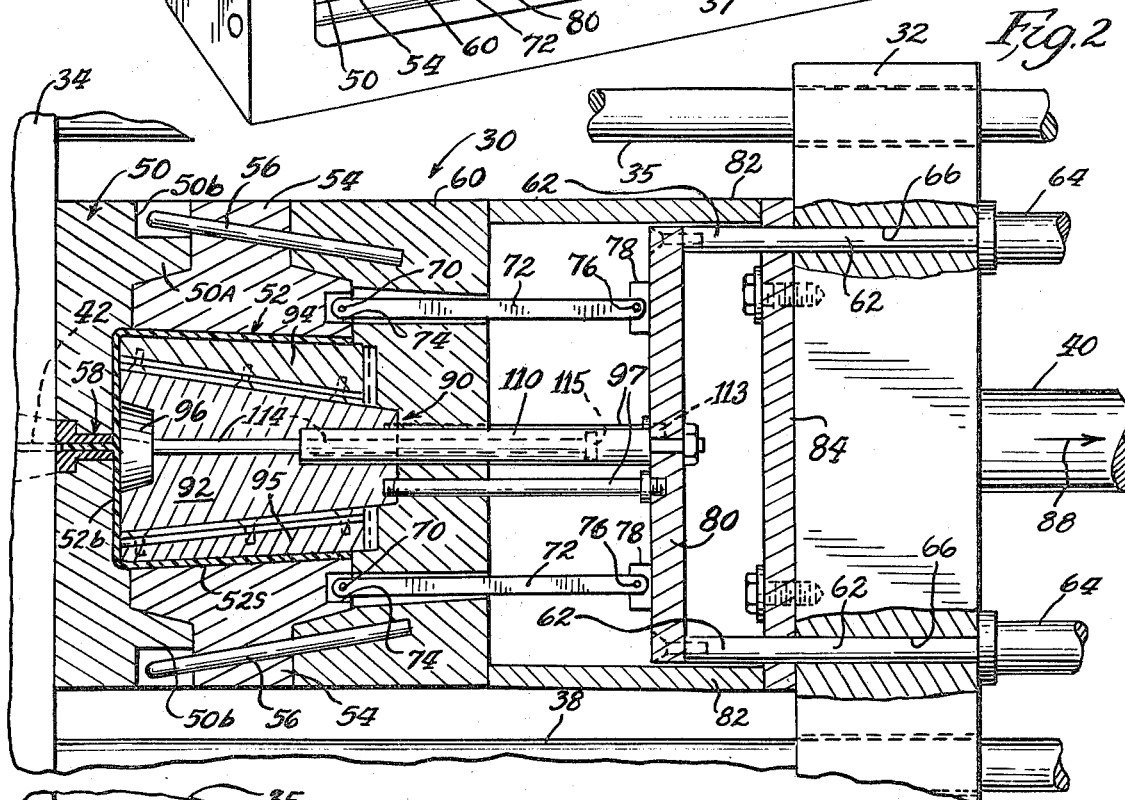
FIG. 2 is a longitudinal section of a portion of the same mold apparatus, taken along the lines 2—2 of FIG. 1. In this view, the mold components are shown in their closed or molding position.
Figure 3:
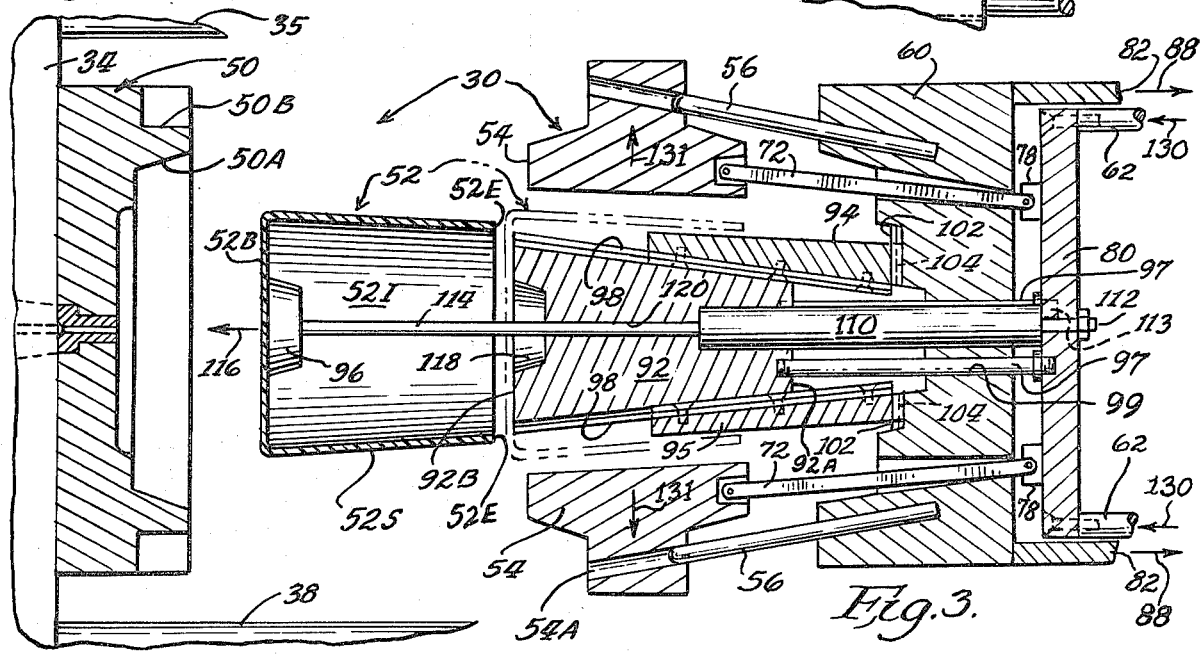
FIG. 3 is a view of the same apparatus which is similar in all respects to FIG. 2, except that the mold components are shown in their open position for ejecting a molded part.

The outer contours of the plastic article 52 are molded by the mold section 50, which is responsible for the shape of the outer surface of the bottom wall 52B, by the side mold segments 54, which are responsible for the shape of the outer surface of the side walls 52S, and by the mold section 60, a small portion of which is responsible for molding an annular edge 52E (See FIG. 3) of the plastic article 52. This plastic article is in the form of a tub which has a hollow interior 52I (FIG. 3). The hollow interior is closed off at one end by the bottom wall 52B of the tub, and is open at the opposite end, this opening being surrounded by the annular edge 52E. The shape of the walls of the tub 52 within the hollow interior 52I is molded by a mold core, generally designated 90, which includes a central core segment 92, a plurality of peripheral core segments 94 and 95, and a tub ejection ram 96. During the molding phase of operation of the mold 30, these elements all fit together as shown in FIGS. 2, 4, and 5 to mold the shape of the hollow tub interior 52I. From the view of FIG. 5, it can be appreciated that the outwardly facing surfaces of segments 94 and 95 cooperate to define a circular transverse cross-sectional shape for the tub interior 52I.

From the views of FIGS. 2 and 3 it can be appreciated that the inside diameter of the tub 52 tapers from the bottom wall 52B toward the open end surrounded by the annular edge 52E. Since the outside shape of the mold core 90 must conform to the inside shape of the tub interior 52I, it follows that the diameter of the mold core 90 near the bottom wall 52B is larger than the tub opening. Therefore, after the molding of the tub has been completed, extracting the mold core 90 from the tub presents a problem.

Extraction is accomplished by radially collapsing the mold core 90 so that its diameter no longer exceeds that of the tub opening surrounded by the annular edge 52E. In order to accomplish such core collapse, the peripheral core segments 94 and 95 and the central core segment are moveable relative to each other. The central core segment 92 is formed in the shape of a truncated pyramid which tapers toward the open end of the tub 52. Thus, one end 92A of central core segment 92 is smaller in the transverse dimension than the other end 92B thereof, as best seen in FIG. 3. The cross-sectional shape of the central core segment 92, as is best appreciated from the view of FIG. 5, is that of a hexagon or some other polygonal configuration. Each of the six faces of the hexagon slope radially inwardly toward the small end 92A to define the pyramidal shape. The sloping pyramidal faces have formed therein T-shaped channels 98, and are closely approached by beveled inner faces of the peripheral core segments 94 and 95. The peripheral core segments have respective T-shaped rails 100 (see FIGS. 3 and 7) thereon which are slidably engaged in the respective channels 98. This permits the peripheral core segments 94 and 95 to slide axially relative to the central core segments 92. But when they do so, the slope of the pyramidal faces of the central core segment 92 causes the peripheral core segments 94 and 95 also to be cammed radially inwardly. As a result, the overall diameter of the mold core 90 decreases. Moreover, the slope of the pyramidal faces is greater than the slope of the tub walls 52S, so that the mold core collapses radially sufficiently to be extracted through the open end of the tub surrounded by the annular edge 52E.

The peripheral core segments 94 and 95 are connected to the mold section 60. The central core segment 92, however, is connected to the movable platform structure 80 by means of three connecting rods 97, only two of which are visible in FIGS. 2-4 (but see also FIG. 5). Consequently the central core segment 92 is driven (or extended) away from the movable platen 32 in an axial direction when the piston rods 62 are actuated by hydraulic cylinders 64. The rods 97 which provide the driving connection between the central core segment 92 and the platform 80 pass slidably through appropriate clearance bores 99 (FIG. 3) formed in the mold section 60.

The net result is that the peripheral core segments 94 and 95 remain at a fixed distance from the movable platen 32, while the central core segment 92 can be driven away from the platen 32. This results in axial relative motion between the central core segment 92 and the peripheral core segments 94, 95. The axial relative motion in turn causes the radial core collapse described above.

The connection between the peripheral core segments 94 and 95 and the mold section 60 is in the form of radially oriented T-shaped rails 102, which are affixed to the mold section 60 and are received slidably within radially oriented T-shaped channels 104 formed at the extreme axial end of the peripheral core segments 94 and 95 (see FIGS. 3 and 6). As a result of this interconnection, the peripheral core segments are not permitted to move axially relative to the mold section 60, but they are permitted to move radially inwardly relative to the mold section 60, because the rails 102 slide in the channels 104 as the peripheral core segments are cammed in that direction by the interconnection of rails 100 and channels 98.

A cylinder 110, actuated by air or hydraulic pressure, is received within the central core segment 92 and is secured by a bolt 112 to platform 80. This cylinder is supplied with fluid through a duct 113 formed in the platform 80. The cylinder actuates, by means of a piston rod 114 and piston 115, the tub extraction ram 96, which forms part of the mold core 90. Alternatively, a mechanical drive could be used to actuate the ram 96. The direction of motion of the ram, when actuated, is indicated by arrow 116 in FIG. 3. The central core segment 92 is formed with a recess 118 (FIG. 3) within which the ram 96 is stored prior to actuation thereof by the piston rod 114 and cylinder 110. The central core segment is also formed with a central clearance bore 120 which permits the piston rod 114 to pass slidably through for actuating the ram 96.

The operation of the mold 30 for extraction of the tub 52 will now be described. After the tub 52 has been formed from the thermoplastic material injected into the mold cavity, the main piston rod 40 is actuated to retract the movable platen 32, the mold section 60, and the entire mold core 90 axially from the fixed platen 34 and the mold section 50, as indicated by the arrows 88 in FIGS. 2 and 3. After opening of the mold has reached a desired stage, then the hydraulic cylinders 64 are actuated to extend the auxiliary piston rods 62 axially relative to the movable platen 32. But the axial motion of the piston rods 62 relative to the platen 32 is in the opposite direction from that of the platen, as indicated by arrows 130 in FIG. 3. As a result of this motion, the platform 80 and connecting rods 97 cause the central core segment 92 to be separated from the mold section 60. The peripheral core segments 94 and 95, however, stay with the mold section 60 because of the connection at rails 102. The motion of the central core segment 92 relative to the peripheral core segments 94 and 95 causes the radial collapse of the mold core 90, as described above, so that the mold core can be extracted through the open end of the tub 52 surrounded by the annular edge 52E.

The side mold segments 54 are also axially separated from mold section 60, because they are connected to platform 80 by links 72. As the side mold segments 54 are being displaced axially relative to the mold section 60, they also are moving relative to the guide pins 56 because the latter are fixed to mold section 60. Because the guide pins 56 slant radially outwardly, as the side mold segments 54 move relative thereto these guide pins exert a radially outward camming force against the walls of respective clearance bores 54A. This causes the side mold segments 54 to be forced radially outwardly from the side walls 52S of the tub (see arrows 131). The pivotal connections 70 and 76 of links 72 to the side mold segments 54 and to the flanges 78 permit these links to rotate to accommodate the radial displacement of the side mold segments 54. This displacement frees the side mold segments from their engagement with the tub walls 52S, and thus prepares the way for extraction of the tub 52.

At this point in the operation of the mold 30, therefore, the mold core 90 has been collapsed radially inwardly, and so freed from engagement with the inner surfaces of tub side walls 52S; while the side mold segments 54 have been displaced radially outwardly, and thus freed from the outside surfaces of those tub walls. If the activation of the ram 96 is delayed, the central core segment 92 will still be within tub 52, as illustrated by the phantom position of the latter in FIG. 3. But even so, the extension of the central core segment will have stripped the tub axially from the peripheral core segments 94 and 95, leaving them partially outside the tub. This contrasts with the operation of the prior art molds discussed above; in which the central core segment is withdrawn from the tub (rather than extended toward the tub as here), and the peripheral core segments remain inside the tub during radial collapse of the core.

Shortly after the actuation of the platform 80, the cylinder 110 is actuated, causing the piston rod 120 to drive the tub extraction ram 96 out of its nesting place 118, thus removing the tub 52 from the central core segment 92 (see FIG. 3).

In this embodiment of the invention there are six peripheral core segments 94 and 95. As seen in FIG. 5, the three segments 94 occupy smaller portions of the circumference of the mold core than do the three segments 95; and the larger and smaller segments are alternately interspersed with each other about said circumference, with the larger segments overlapping the smaller ones where they abut each other at interfaces 132. In order to prevent the smaller segments 94 from blocking the radially inward movement of the larger segments 95, the smaller segments must move radially inward at a somewhat faster pace, i.e. along a steeper slope, than the larger segments do. Thus, the central core segment 92 has alternate pyramidal faces 92C (FIGS. 5 and 7) which slope inwardly at a relatively steep angle alpha (FIG. 7), while the other alternate pyramidal faces 92D thereof slope inwardly at a somewhat smaller angle beta. If the six segments 94 and 95 were all of the same circumferential size and thus did not overlap at interfaces 132; or if the slope angles alpha and beta of pyramidal faces 92C and D were equal; it would be impossible for the mold core 90 to collapse. The peripheral core segments would be in mutually blocking relation, like keystones in an archway; and thus could not be displaced radially inwardly.

It will now be appreciated that this invention provides a new approach to the design of apparatus for the molding or re-entrant circular plastic vessels. The disclosed embodiments are preferred, but there may be other variations of the invention which fall within the scope of the novel principles taught herein. For this reason, the disclosed embodiments are to be taken as merely exemplary, and such variations are intended to be covered by the following claims.

The invention claimed is:

1. Apparatus for injection molding a hollow plastic tub having an open end, a closed end and an uninterrupted interior side wall surface of circular transverse cross-section, said interior side wall surface diverging toward said closed end whereby the tub has a smaller radius at said open end than at said closed end, said apparatus comprising:

mold core means for molding an interior surface of said plastic tub, including central core segment means defining a polygonal transverse cross-sectional outer envelope with polygon faces and a plurality of peripheral core segment means surrounding said central core segment means, said outer envelope defined by said polygon faces diverging in a direction toward said closed end of said tub;

said peripheral core segment means being mutually contiguous and having respective outward faces collectively defining a continuous circular transverse cross-sectional shape with each individual peripheral core segment means defining a continuous, uninterrupted outer surface diverging in a direction toward said closed end for molding said interior surface of said side wall of said plastic tub;

the divergence of the outer envelope of said central core segment means being greater than the divergence of the uninterrupted outer surface of said peripheral core segment means;

core collapsing means for causing relative movement between said central core segment means and said peripheral core segment means during a tub extraction phase of operation;

said means for causing said relative movement including means for imparting at least a component of motion to said peripheral core segment means which is in a radially inward direction relative to said central core segment means and the plastic tub, whereby to reduce the transverse diameter of said mold core means and to provide clearance during said tub extraction phase for said continuous, uninterrupted diverging surfaces of said peripheral core segment means.

2. The apparatus of claim 1 wherein said peripheral core segment means have respective radially inward faces and during a molding phase of operation said peripheral core segment means are positioned with said inward faces thereof adjacent respective polygon faces of said central core segment means, and further comprising means for guiding said peripheral core segment means relative to said respective adjacent polygon faces.

3. The apparatus of claim 2 wherein said core collapsing means axially displaces said central core segments means relative to said peripheral core segment means.

4. The apparatus of claim 3 wherein said guide means comprises rail and slot means on said polygon faces of said central core segment means and on said peripheral core segment means interengaging for sliding movement of said polygon faces relative to said peripheral core segment means.

5. The apparatus of claim 1 wherein said core collapsing means axially displaces said central core segment means relative to said peripheral core segment means.

6. The apparatus of claim 5 further comprising platen means and means affixing said peripheral core segment means to said platen means, said core collapsing means being mounted on said platen means and arranged to extend said central core segment means axially relative to said platen means.

7. The apparatus of claim 6 wherein said core collapsing means further comprises connecting means arranged to permit said pheripheral core segment means to move radially relative to said central core segment means without moving axially therewith relative to said platen means.

8. The apparatus of claim 7 wherein said connecting means comprises radially oriented rail means arranged for axial restraint of said peripheral core segment means relative to said platen means while permitting said peripheral core segment means to slide along said rail means in said radial direction relative to said platen means.

9. The apparatus of claim 6 further comprising side mold segment means located radially outwardly of said mold core means and arranged to mold an exterior surface of said side wall of said plastic tub, and displacing means affixed relative to said platen means and arranged to cam said side mold segment means radially outwardly during said extension.

10. The apparatus of claim 6 further comprising ram means positioned against an inside surface of a bottom wall of said plastic tub, motive means on said platen means, and connecting means responsive to said motive means to drive said ram means axially away from said central core segment means whereby to dislodge said plastic tub therefrom.

* * * * *